(12) United States Patent
Gosnell

(10) Patent No.: US 12,381,744 B2
(45) Date of Patent: *Aug. 5, 2025

(54) SINGULAR TRIGGER SINGULAR EVENT SIGNAL PROCESSING SYSTEM

(71) Applicant: David W. A. Gosnell, Killeen, TX (US)

(72) Inventor: David W. A. Gosnell, Killeen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,433

(22) Filed: Jan. 17, 2024

(65) Prior Publication Data

US 2024/0348456 A1    Oct. 17, 2024

Related U.S. Application Data

(63) Continuation of application No. 18/353,707, filed on Jul. 17, 2023, now Pat. No. 11,917,079.

(60) Provisional application No. 63/368,599, filed on Jul. 15, 2022.

(51) Int. Cl.
*H04L 9/32* (2006.01)
(52) U.S. Cl.
CPC ............................... *H04L 9/3263* (2013.01)
(58) Field of Classification Search
None
See application file for complete search history.

(56) References Cited

U.S. PATENT DOCUMENTS

| | | | |
|---|---|---|---|
| 7,856,361 B1 | 12/2010 | Bell | |
| 9,219,749 B2 * | 12/2015 | Khalsa | G06Q 30/0633 |
| 2007/0061160 A1 | 3/2007 | Fisher | |
| 2008/0086314 A1 | 4/2008 | Fitzpatrick | |
| 2010/0121772 A1 | 5/2010 | Fitzpatrick | |
| 2015/0019449 A1 | 1/2015 | Lalwani | |
| 2017/0103230 A1 | 4/2017 | O'Brien | |
| 2022/0147406 A1 * | 5/2022 | Laurenzio | G06F 16/285 |

* cited by examiner

*Primary Examiner* — Brandon Hoffman
(74) *Attorney, Agent, or Firm* — Thompson Patent Law Offices PC

(57) ABSTRACT

Apparatus and associated methods relate to a singular event notification system (SENS). In an illustrative example, the SENS may automatically authenticate a singular event signal and dynamically generate an event action package as a function of an event notification signal. The operation, for example, may include retrieving a user notification profile (UNP) associated with a user account upon receiving an event notification signal (ENS). For example, the UNP may include relevant entities to be notified in response to the ENS. If the ENS is authorized based on the UNP, for example, the SENS apply an action model to the UNP to generate an event action package to be transmitted to a predetermined destination. For example, the event action package may include customized forms and contact instructions generated based on entities identified based on the UNP. Various embodiments may advantageously generate a timely and secure response to the relevant entities.

20 Claims, 11 Drawing Sheets

SINGULAR TRIGGER SINGULAR EVENT SIGNAL PROCESSING SYSTEM

CROSS-REFERENCE TO RELATED APPLICATIONS

This application is a continuation of U.S. application Ser. No. 18/353,707, titled SINGULAR TRIGGER SINGULAR EVENT SIGNAL PROCESSING SYSTEM," filed by David W. A. Gosnell, on Jul. 17, 2023, issued on Feb. 27, 2024 as U.S. Pat. No. 11,917,079, which application claims the benefit of U.S. Provisional Application Ser. No. 63/368,599, titled "RELEVANT ENTITIES SINGLE TRIGGER EVENT NOTIFICATION DISTRIBUTION SYSTEM," filed by David W. A. Gosnell, on Jul. 15, 2022.

This application incorporates the entire contents of the foregoing application(s) herein by reference.

TECHNICAL FIELD

Various embodiments relate generally to an integrated system and process to notify relevant entities.

BACKGROUND

In today's fast-paced and interconnected world, timely and effective notification of important life events is becoming more important. Various life events, for example, including births, deaths, marriages, and other significant milestones, may hold great personal and legal significance. Traditional methods of communication (e.g., phone calls, physical mail) may sometimes be inefficient in providing a timely response for notifying individuals and entities about these events.

Some methods for notifying individuals about life events may be limited in terms of reach, speed, and convenience. For example, manual notifications through phone calls or written correspondence may be time-consuming and prone to delays and/or errors.

In the context of informing individuals and/or entities about a death, sometimes there may involve legal professionals (e.g., lawyers). In some examples, a lawyer may possess an expertise and/or knowledge to navigate legal requirements and responsibilities associated with notifying a death. For example, a lawyer may help ensure that proper channels may be utilized, relevant legal obligations may be fulfilled, a notification process may be executed efficiently, or a combination thereof. In some examples, even with legal involvement, challenges may be present in reaching all concerned parties in a timely manner, especially in cases where multiple individuals or entities need to be notified.

SUMMARY

Apparatus and associated methods relate to a singular event notification system (SENS). In an illustrative example, the SENS may automatically authenticate a singular event signal and dynamically generate an event action package as a function of an event notification signal. The operation, for example, may include retrieving a user notification profile (UNP) associated with a user account upon receiving an event notification signal (ENS). For example, the UNP may include relevant entities to be notified in response to the ENS. If the ENS is authorized based on the UNP, for example, the SENS may apply an action model to the UNP to generate an event action package to be transmitted to a predetermined destination. For example, the event action package may include customized forms and contact instructions generated based on entities identified based on the UNP. Various embodiments may advantageously generate a timely and secure response to the relevant entities.

Various embodiments may achieve one or more advantages. For example, some embodiments may include a secure authentication mechanism to advantageously prevent fraudulent attempts of sending the ENS. Some embodiments, for example, may dynamically generate a user interface based on a relevant entity to gather minimum personal information to advantageously improve privacy protection to the user account. For example, some embodiments may advantageously store non-complete personal identification to advantageously provide non-comprisable person identification storage. Some embodiments, for example, may advantageously generate guidance messages dynamically based on user response received from the user device. Some embodiments, for example, may advantageously notify relevant entities (e.g., banks, insurance companies, membership organizations, police) before malicious actors (e.g., vandals, thieves, con artists) may seek to impersonate the dead person and/or prey on a period of transition. For example, some embodiments may advantageously avoid continuing charges of loan and/or subscriptions to the user. Some embodiments may, for example, include a step to obtain a payment guarantee from an insurance company to avoid paying a deposit to the funeral home. For example, some embodiments may advantageously include an automatic sign up process of the user account.

The details of various embodiments are set forth in the accompanying drawings and the description below. Other features and advantages will be apparent from the description and drawings, and from the claims.

BRIEF DESCRIPTION OF THE DRAWINGS

FIG. 4 is a swim lane diagram showing an exemplary process of the RECS.

FIG. 6A, FIG. 6B, FIG. 6C, and FIG. 6D depict schematic diagrams showing exemplary user interfaces for personal notification profile (PNP) management.

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a Relevant Entity Communication System (RECS) is introduced with reference to FIGS. 1-2. Second, that introduction leads into a description with reference to FIGS. 3A-4 of some exemplary embodiments of data structures and processes of the RECS. Third, with reference to FIGS. 5-6D, an exemplary user interface is described in application to an exemplary RECS. Fourth, this document describes exemplary methods useful for setting up a new user account and an exemplary notification process with reference to FIGS. 7-9. Finally, the document discusses further embodiments, exemplary applications and aspects relating to relevant entities communication during a critical event (e.g., death of a user).

Figure 1:
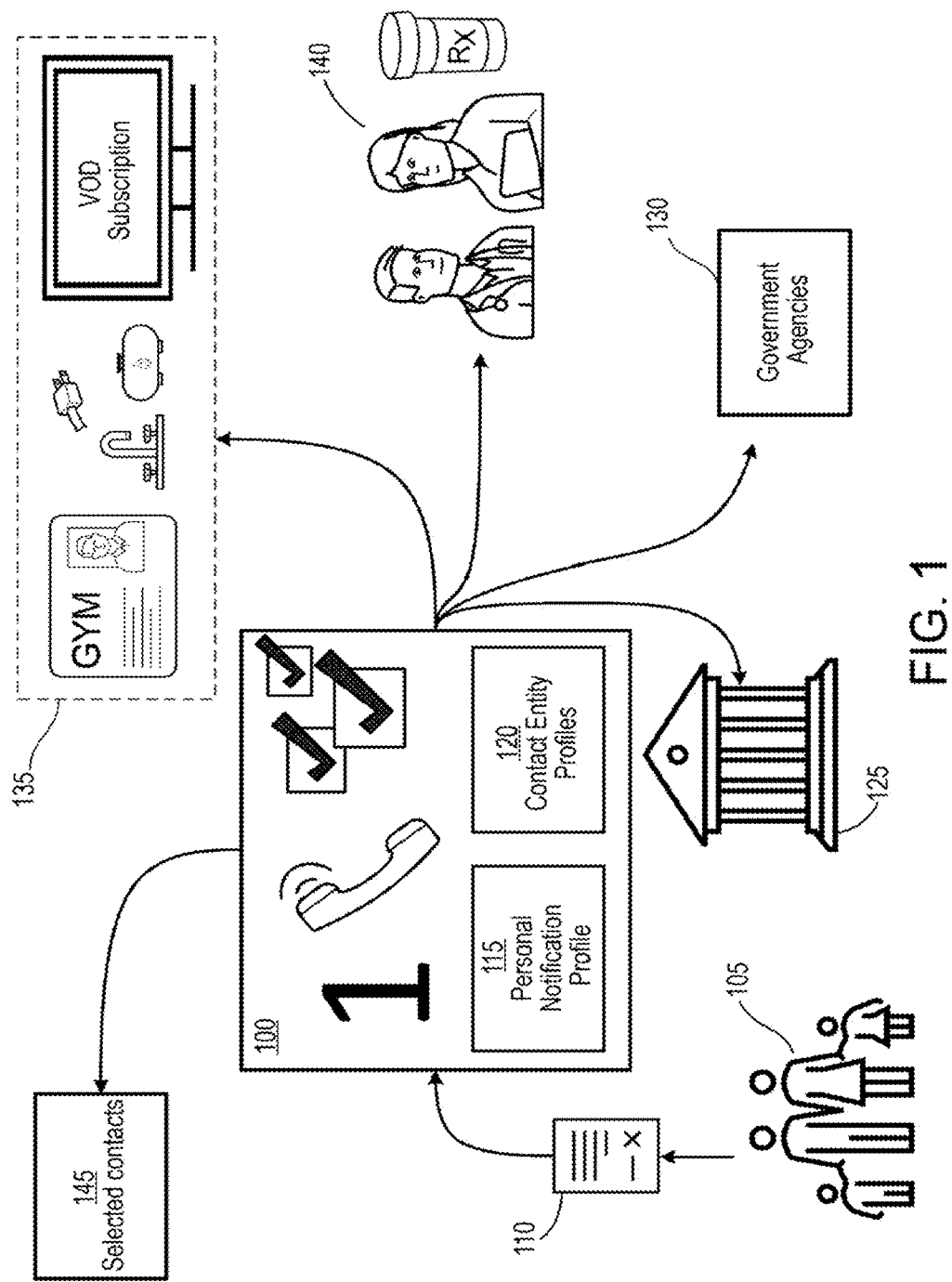
FIG. 1 depicts an exemplary Relevant Entity Communication System (RECS) employed in an illustrative use-case scenario.

FIG. 1 depicts an exemplary Relevant Entity Communication System (RECS 100) employed in an illustrative use-case scenario. In this example, a user of the RECS 100 may have a singular trigger event (e.g., death of the user, graduation of the user, marriage of the user, serious accident and/or injury of the user). As an illustrative example, the user may pre-select notification contacts 105 (e.g., family members, attorney, or close contact of the user) to notify the RECS 100 that the trigger event (e.g., the passing away) has occurred to the user.

As shown, the notification contacts 105 may notify the RECS 100 by providing (e.g., uploading via an online portal, calling on a phone) a notification signal (e.g., a supporting document 110 in this example). In some implementations, the supporting document may be predefined in the RECS 100 (e.g., a death certificate, a credential with a passcode). For example, the RECS 100 may be notified by having a user device (e.g., operated by one of the notification contacts 105) to log into an online portal using a set of predetermined credentials. In some examples, the RECS 100 may be notified by calling a predetermined telephone number and provide supporting documentation and credentials to the RECS 100. In some implementations, the RECS 100 may be notified by a combination of the above notification channels.

In some implementations, the notification contacts 105 may notify the RECS 100 by providing notice (e.g., via an online portal, via an app running on a mobile device). The RECS 100 may confirm predetermined credentials of the notification contacts 105. The RECS 100 may, for example, begin a notification process in a preliminary mode before receiving a supporting document 110. For example, the supporting document 110 (e.g., a death certificate) may be received days or weeks later after processing by appropriate authorities. By beginning a notification process immediately upon notification in the preliminary mode, relevant entities (e.g., banks, insurance companies, membership organizations, police) may advantageously be notified before malicious actors (e.g., vandals, thieves, con artists) can seek to impersonate the dead person and/or prey on a period of transition before heirs, executors, and/or authorities are able to systematically establish contact and monitoring of assets.

As an illustrative example without limitation, the RECS 100, upon receiving the supporting document 110, may notify various relevant entities based on a predetermined personal notification profile (PNP 115) and contact entity profiles 120. For example, the PNP 115 may include a list of predetermined relevant entities to be notified upon the trigger event. In this example, the RECS 100 notifies financial institutions 125 (e.g., credit card companies, lender banks, financial advisors, insurance companies, other financial institutions), government agencies 130 including 401k, IRAs, DMV, VA, Medicare, and/or the state government, subscription services 135 (e.g., gym, on-demand entertainment subscription, software, internet, TV/Cable TV/Satellite TV, radio, magazines), and medical and health companies 140. Accordingly, the RECS 100 may advantageously avoid continuing charges of loan and/or subscriptions to the user. In this example, the predetermined PNP 115 may also notify selected contacts 145 for follow-up tasks. For example, the predetermined PNP 115 may determine a selected friend to take care of a pet. In some examples, the predetermined PNP 115 may include a family attorney to be notified to execute a will of the user.

The contact entity profiles 120 may include procedures, forms, and contact channels (e.g., phone number, email address, a specific account manager of the user at one of the relevant entities). In some implementations, the RECS 100 may notify relevant entities by generating and completing relevant forms based on the contact entity profiles 120. In some examples, the contact entity profiles 120 may include flow mechanisms to benefit the user. For example, the contact entity profiles 120 may include a step to obtain a payment guarantee from an insurance company of the user to be presented to a funeral home so that the user may advantageously avoid paying a deposit to the funeral home.

In some implementations, the RECS 100 may include a preselected designator(s) for managing the notification process. For example, the preselected designator may be selected by the user during a configuration mode. For example, the user may select, among the family members (e.g., the notification contacts 105), his/her spouse as the preselected designator. In some implementations, the preselected designator may receive an event action package for a corresponding relevant entity. For example, the event action package may include customized (e.g., prefilled, populated) forms specific for the corresponding relevant entity. For example, the event action package may include contact instructions of the corresponding relevant entity. For example, the contact instructions may include email addresses. For example, the contact instructions may include a phone number. For example, the contact instructions may include specific contact at a specific branch of a relevant entity.

In some examples, the preselected designator may follow the contact instructions to notify one or more relevant entities assigned to the preselected designator. In some implementations, the contact instructions may be generated interactively. For example, some contact instructions may be delivered via an online application. For example, the contact instructions may be communicated to the preselected designator via a chatbot. For example, the chatbot may advantageously generate answers for questions asked by the preselected designator.

In some implementations, the user may select multiple designators. For example, each designator may be assigned to distinct and/or overlapping groups of relevant entities. For example, a lawyer may be selected to notify the banks and insurance companies. For example, a spouse may be assigned to notify family members.

Figure 2:
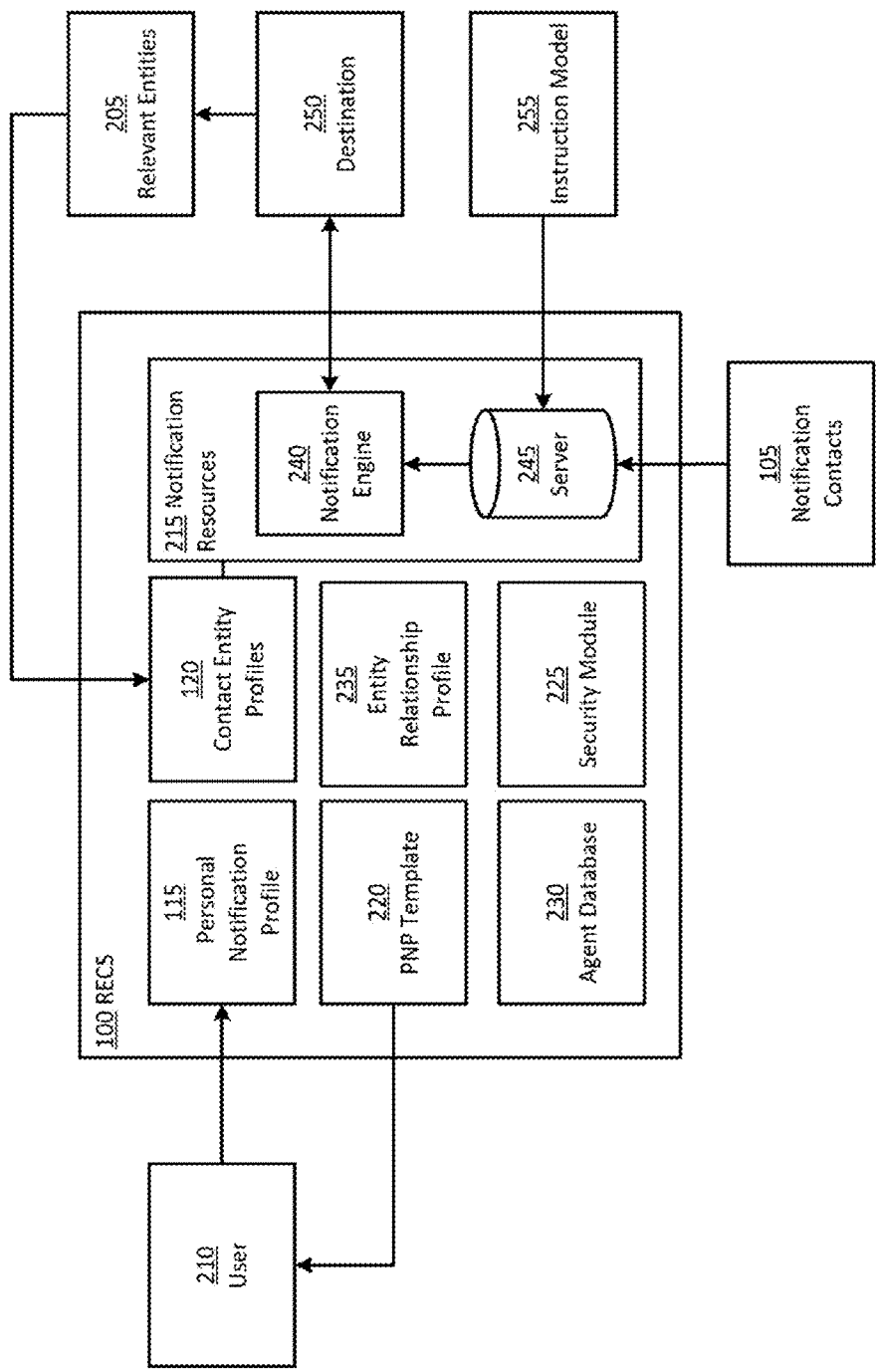
FIG. 2 is a block diagram depicting an exemplary RECS.

FIG. 2 is a block diagram depicting an exemplary RECS 100. For example, the RECS 100 may automatically notify relevant entities 205 upon receiving a singular event notification of a user 210 (e.g., a death notification signal of the user). For example, the relevant entities 205 may include the financial institutions 125, the government agencies 130, the subscriptions services 135, the medical and health companies 140, and the selected contacts 145 as described with reference to FIG. 1.

In this example, the RECS 100 includes a notification resources 215. For example, after receiving the singular event notification (e.g., by receiving an identification and authorization credentials of the user 210 and a notification message) from the notification contacts 105, the RECS 100 may use the notification resources 215 to notify the relevant entities 205. In some implementations, the notification resources 215 may include a predetermined authentication mechanism to validate the received notification signal. For example, the predetermined authentication mechanism may include a secret codeword. For example, the predetermined authentication mechanism may include a username and password pair. For example, the predetermined authentication may include a two factor authentication including a predetermined phone number and a passcode.

As shown, the RECS 100 includes the PNP 115, the contact entity profiles 120, a PNP template 220, a security module 225, and an agent database 230. The PNP 115 may, in some examples, include a list of user-selected relevant entities. In this example, the RECS 100 may use the PNP template 220 to guide the user 210 to provide the list of relevant entities. For example, upon signing up with the RECS 100, the RECS 100 may prompt the user 210 to provide personal information including demographics of the user 210. In some implementations, the RECS 100 may prompt the user 210 to provide, for example, personal identification at government agencies, account information at financial institutions, insurance policy information, loans information (individual loans, home loan, auto loan, student loans, mortgage, business loan), and/or subscription account information.

In the depicted example, the RECS 100 further includes an entity relationship profile (ERP 235). For example, for each of the user 210, the PNP template 220 may be generated based on personal information (e.g., demographics of the user 210), and an ERP 235. In some examples, the ERP 235 may include various possible relationships between the user 210 and the relevant entities 205.

In some implementations, the RECS 100 may generate a configuration user interface at a user device of the user 210. For example, the RECS 100 may display the PNP template 220 based on a signal received from the user 210. For example, the PNP template 220 may include personal identification entries and at least one asset entry. For example, the user interface may receive user input to generate the PNP 115. In some implementations, the user interface may be generated based on one or more previous entries from the user. In some examples, as described in further details with reference to FIGS. 3A-B, the PNP template 220 may be configured such that the user interface dynamically acquires minimally sufficient personal information to identify an account in a corresponding relevant entity.

As an illustrative example without limitation, upon receiving a configuration signal from a user device, the RECS 100 may generate a user interface localized based on an origin location of the user device. For example, the origin location may be generated based on position information (e.g., global positioning system signals, internet protocol information) of the received signal. For example, the user interface may also be dynamically changed when the user inputs a location differ from the detected origin location. In some examples, based on a relevant entity selected, the RECS 100 may generate a user interface specifically designed for acquiring relevant information of the selected entity. For example, if the selected entity is an insurance policy, the user interface may include a text box for inputting the agent of the insurance policy. In some examples, if the selected entity is a bank, the user interface may include a dropdown menu of various branches of the bank in a local area. For example, upon receiving a user input of a specific bank, the RECS 100 may generate dynamically to request for information specifically required by the specific bank.

For example, the ERP 235 may include the relevant entities 205 and their relationships within an information system. For example, in a software layer, the relevant entities 205 may be implemented as a class which may include one or more instances. In various examples, the relationship between two entities may include interactions between the entities and their cardinality (e.g., one-to-one or one-to-many). In some implementations, each entity may be represented by an instance of the object. For example, an insurance object (e.g., representing an insurance relationship) may include a client id, a subscription type, a company name, a phone number, and a status. In some examples, an instance of the insurance object may be generated for each insurance policy entered by the user 210. In some examples, the notification resources 215 may use the instances of the insurance object to obtain information to notify insurance companies for each insurance policy.

In some implementations, the event action package may follow a structure of the ERP 235. For example, the event action package may include reference links between various objects of relevant entities described in the PNP 115.

In some implementations, the notification resources 215 may retrieve information from the contact entity profiles 120 to communicate with the relevant entities 205 after receiving a trigger event notification from the notification contacts 105. In some implementations, the contact entity profiles 120 may include predetermined associations between a pre-existing relevant entity and a contact information corresponding to one of the relevant entities 205. For example, the contact entity profiles 120 may include a notification entry (e.g., contact information of the selected contacts 145) in the PNP 115.

As shown in this example, the notification resources 215 includes a notification engine 240 and a computer server 245. For example, the notification engine 240 may retrieve customer service telephone numbers of various government agencies (e.g., a local police station) for calling and reporting a death of the user 210. In some implementations, the computer server 245 may generate, based on the PNP 115 and the contact entity profiles 120, an event action package of the relevant entities 205 at a destination address 250 (e.g., a destination device, a mailing address, a phone number) of a preselected designator (as described in FIG. 1).

As an illustrative example, the computer server 245 may retrieve insurance companies (e.g., 15 life insurance, 7 annuities, etc.) relevant to the user 210. In some examples, the event action package may include a claim form for each of the insurance companies and corresponding addresses (or email addresses) for sending the claim forms. In various implementations, the notification engine 240 may automatically populate the claim forms with demographic information of the user 210. For example, (a user at) the destination address 250 may efficiently use the automatically populated claim forms to follow up with the insurance companies. In some implementations, the notification engine 240 may, as soon as notified of a death of the user, download information from the PNP 115 and send the information out to different people to make notification of the death.

In some implementations, the computer server 245 may automatically generate, based on most up-to-date information in the contact entity profiles 120 and the ERP 235, the event action package to be displayed at the destination address 250. For example, the notification engine 240 may use the event action package as a checklist for a notification process for the user 210. In some examples, the event action package may include name and phone number corresponding to each of the relevant entities 205 so that, at the destination address 250, a user (e.g., a processor of the event action package) may advantageously follow-up with a notification process.

In some implementations, the event action package may list the relevant entities 205 based on predetermined levels of criticality. As an illustrative example, the processor (e.g., a preselected designator, a notification staff) may first notify the relevant entities 205 with the highest priority as indicated by the event action package. For example, the relevant entities 205 with the highest priority may include the relevant entities 205 having highest financial risks (e.g., banks, credit cards, pharmacy, insurance companies). Next, the processor at the destination address 250 may then notify the relevant entities 205 with the second priority as indicated by the event action package. For example, the relevant entities 205 with the second priority may include a 401k account, retirement accounts, or other accounts that may be less accessible by a fraud person. Next, the processor may notify other relevant entities 205 with least financial criticality (e.g., loans, video demand subscriptions, gym).

In this example, the computer server 245 is operably coupled to an instruction model 255. For example, the computer server 245 may generate contact instructions based on the instruction model 255. For example, the contact instruction may include guidance messages related to notifying one of the relevant entities 205. In some implementations, the instruction model 255 may include a large language model to interactively generate the guidance messages as a function of user response received from a device from the destination address 250. As shown, the instruction model 255 may be external to the RECS 100. In some implementations, the instruction model 255 may be implemented within the RECS 100 (e.g., in the computer server 245).

The security module 225, in this example, provides data security for the RECS 100 to prevent fraudulent usage of the RECS 100. In some implementations, the security module 225 may authenticate the user 210 to the RECS 100 by a login and password. In some examples, the security module 225 may provide a multifactor authentication to the RECS 100. In some implementations, the RECS 100 may provide, upon successful login to the RECS 100, a graphical user interface (GUI) to the user 210 to create/update information associated with the relevant entities 205.

In some implementations, the security module 225 may authenticate a notification process from the notification contacts 105. For example, after joining the RECS 100, the security module 225 may generate a unique identification code corresponding to the user 210. In some implementations, the RECS 100 may send multiple (e.g., 4, 6, 8) identification cards to the user 210 and the user-selected notification contacts 105. For example, the notification contacts 105 may use the identification code to notify the RECS 100 of a trigger event of the user 210. In some examples, when the trigger event is death of the user 210, the security module 225 may advantageously require supporting documents (e.g., a death certificate of the user 210) from the notification contacts 105 (when it becomes available).

The agent database 230, for example, may store identification of agents approved to collaborate with the RECS 100. For example, the agents may send market materials to potential users. In some implementations, when the user 210 agrees to join the RECS 100, the agents may generate an invitation link (e.g., via a GUI) to send to the user 210. For example, the invitation link may be generated by the security module 225. Using the invitation link (by selecting the link), the user 210 may be presented with a step-by-step guide to create the PNP 115 using the PNP template 220. In some implementations, the agents may present some bank authorization letters to the user 210 for pre-approval. For example, the user 210 may upload the approved bank authorization letters while setting up an account in the RECS 100. In some examples, the agents may advantageously facilitate a sign up process for the RECS 100 and following notification process for the user 210 without knowing any account details of the user 210.

In some implementations, by way of example and not limitation, one or more agents (e.g., each agent) may be assigned to a corresponding marketing company (e.g., insurance agency). In some implementations, for example, deactivating an agent may deactivate associated clients. In some implementations, by way of example and not limitation, an agent may deactivate a client (e.g., due to non-payment). In some implementations, by way of example and not limitation, an agent may be deactivated (e.g., if the agent left the marketing company) such that the agent no longer has access to the associated clients, but the associated client(s) may remain activated (e.g., still associated with the marketing company).

In various examples, the RECS 100 having the PNP template 220 may advantageously generate an automatic process for generating the PNP for the user 210. In some examples, upon receiving a notification of the trigger event, the RECS 100 may automatically generate forms and letters to be sent to the relevant entities 205 based on the contact entities profile 120 associated with the PNP 115 of the user 210.

Figure 3A:
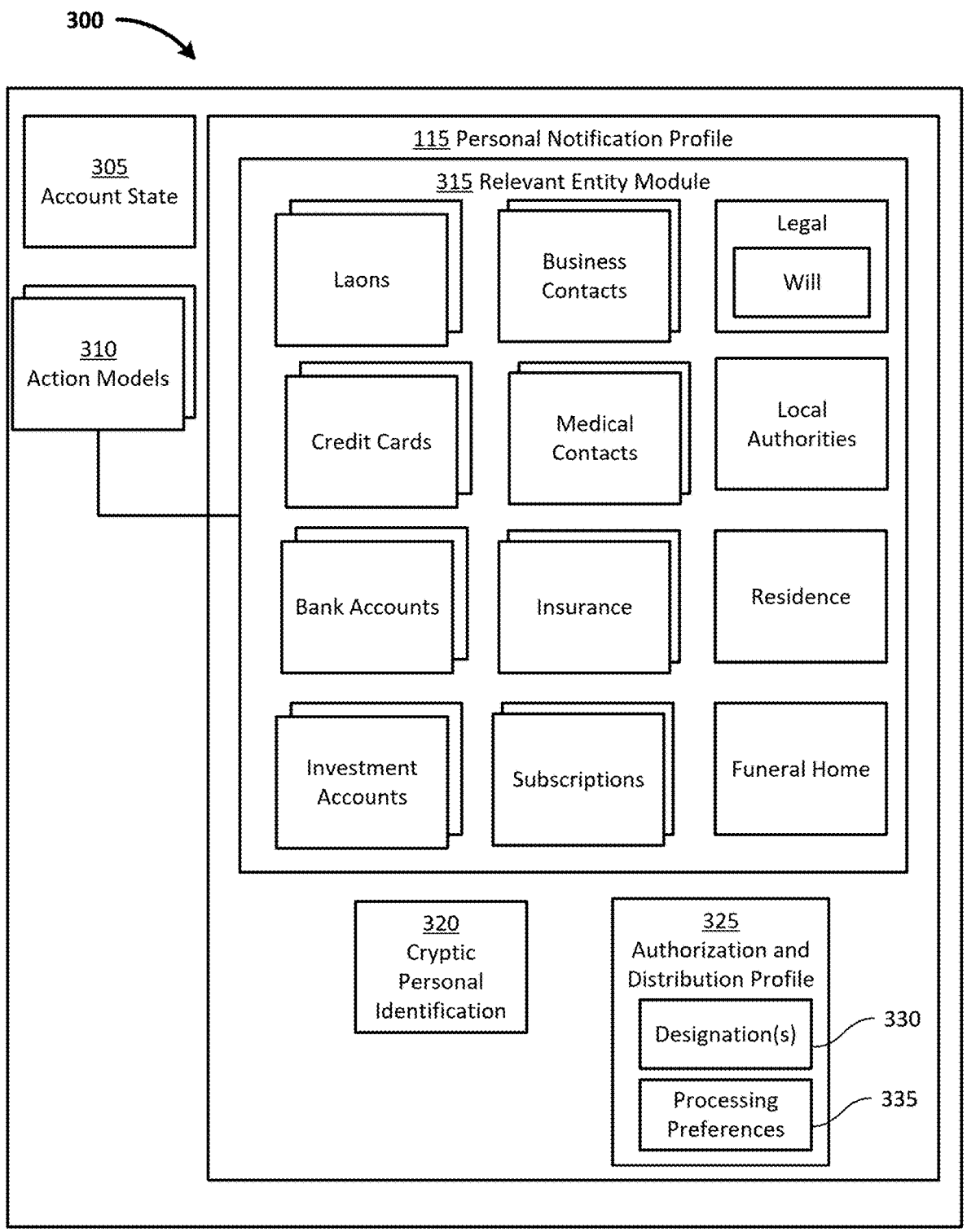
FIG. 3A and FIG. 3B are block diagrams of an exemplary user account of a RECS.
Figure 3B:
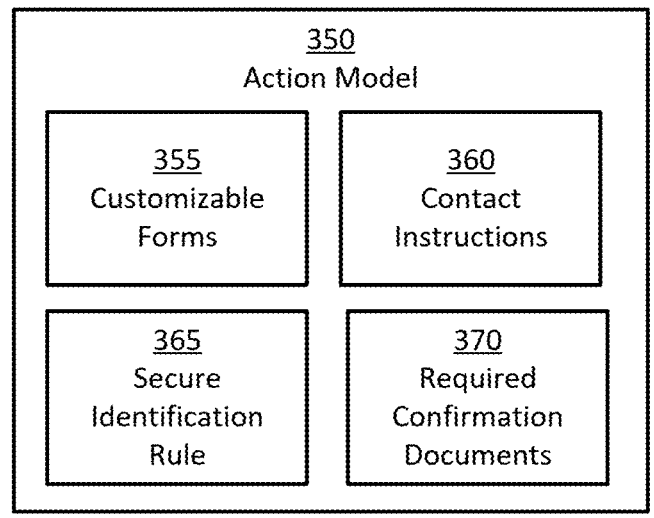

FIG. 3A and FIG. 3B are block diagrams of an exemplary user account of a RECS. As shown in FIG. 3A, a user account 300 includes an account state 305, action models 310, and the PNP 115. For example, the account state 305 may include a normal state, a preliminary state, and a confirm state. For example, in the normal state, a user may be authenticated to modify information in the user account 300. For example, the user may add or remove relevant entities (e.g., the relevant entities 205) to or from the user account 300. For example, the user may modify contact information of oneself and/or the notification contacts 105. For example, the user may modify his/her personal identification.

Upon a singular event signal is authenticated, the RECS 100 may set the account state 305 into the preliminary state. For example, in the preliminary state, the user account 300 may be set to read-only until the singular event is proved to be false. In this state, for example, the RECS 100 may generate the event action package to notify some or all of the relevant entities 205. For example, the notified entities may be alerted to fraudulent access attempts.

When a support document is received, for example, the RECS 100 may set the account state 305 in the confirmation mode. For example, the notification engine 240 may generate, in the confirmation state, copies of the supporting document to relevant entities that require the supporting document (e.g., an insurance company may require the death certificate to release funds to the user's family).

As shown, the PNP 115 includes a relevant entity module (REM 315), a cryptic personal identification (CPID 320), and an authorization and distribution profile (ADP 325). The CPID 320, for example, may include a secure representation of a personal information of a user related to the user account 300. In some implementations, the CPID 320 may be secured by data masking. For example, the CPID 320 may include only a partial representation of an identification (e.g., last 4 digits of a social security number, a zip code of the address, last four digits of a phone number). For example, the obfuscated personal identification information may advantageously limit exposure even if the CPID 320 is exposed. In some implementations, the RECS 100 may use strong encryption algorithms to encode the personal identification information. For example, the CPID 320 may be unreadable without the proper decryption key. For example, the security module 225 may generate the CPID 320.

For example, the ADP 325 may include rules and attributes related to authorization and distribution in response to a singular event. In some implementations, the ADP 325 may include an authorization mechanism (e.g., a passcode, a personal identification mechanism) to authorize an event notification signal. In this example, the ADP 325 includes a designation(s) 330 and processing preference 335. The designation(s) 330 may include one or more destinations for the event action package to be generated. For example, the processing preference 335 may include various preferences selected by the user for processing notification after a singular event. For example, the processing preference 335 may include a priority of the relevant entities to be notified. For example, the RECS 100 may generate more than one event action package according to preference specified in the processing preference 335.

The PNP 115, in this example, includes a REM 315. As shown, the REM 315 includes various relevant entities related to the user of the user account 300. For example, the REM 315 may include financial assets including loans, credit cards, bank accounts, insurance policies, and/or investment accounts. The REM 315 may, for example, also include various subscriptions (e.g., gym, membership, video streaming subscription). In this example, the REM 315 may also include contacts including business contacts and medical contacts. For example, the REM 315 may also include residence notification rules and funeral home instructions. For example, the REM 315 may also include a legal instruction. For example, the legal instruction may include a will. For example, the REM 315 may also include relevant local authorities (e.g., police station contact, tax department).

The action models 310, for example, may be generated based on a corresponding relevant entity. For example, the action models 310 may include detailed rules and/or steps in notifying the corresponding entity of a death of the user.

As shown in FIG. 3B, an exemplary action model 350 is depicted. For example, the action model 350 may be related to one of the relevant entities in the REM 315. In this example, the action model 350 includes customizable forms 355 and contact instructions 360. For example, the customizable forms 355 may be generated by accessing a database of notification forms of a corresponding relevant entity. The contact instructions 360 may include, for example, a step by step guide on notifying the corresponding relevant entity. In some implementations, the contact instructions 360 may be manually generated. In some implementations, the contact instructions 360 may be automatically generated based on information extracted from, for example, the Internet. In some implementations, the contact instructions 360 may be interactively generated based on user input. For example, the contact instructions 360 may be generated by a chatbot connected to a large language model (LLM).

The action model 350 also includes a secure identification rule 365 and required confirmation documents 370. For example, the secure identification rule 365 may include a secure mechanism in identifying an account related to the user. For example, the secure identification rule 365 may include a minimum required information to identify an account of the user. For example, the secure identification rule 365 may include an encryption algorithm in transforming the CPID 320 into (e.g., encrypted) personal information to be transmitted to the corresponding relevant entity.

The required confirmation documents 370, for example, may include various documents required for the corresponding relevant entity to confirm the singular event of the user. For example, the required confirmation documents 370 may include a death certificate. For example, the required confirmation documents 370 may include a police report. For example, the required confirmation documents 370 may include a marriage certificate. For example, the required confirmation documents 370 may include a birth certificate. In some implementations, upon receiving the required confirmation documents 370, the RECS 100 may generate, as a function of the action model 350, a digital copy of the required confirmation documents 370 to be transmitted to the corresponding relevant entity.

In some implementations, the action model 350 and the CPID 320 may advantageously protect user identity in a computer network environment. For example, in a paper based world, a notification system (e.g., a law firm processing a Will of a user) may lock all user information in a vault. In this way, the paper based notification system may secure private information of the user unless the vault is broken into. However, in a computer network environment, with hacking threats that may happen virtually from anywhere at any time, a simple analogy of a lock such as an access management system may not be secure enough. For example, a hacker may compromise the data security system of the RECS 100. However, the hacker may, for example, be prevented from revealing the identification numbers of the user 210 because all the stored identification numbers are masked and/or incomplete.

With the secure identification rule 365 and the required confirmation documents 370, for example, the RECS 100 may possess only a minimum required identification for notifying the relevant entities 205 in the preliminary state. As an illustrative example, a bank may require only masked identification numbers including the last four digits of social security and the last 6 digits of an account number. For example, upon a death of a user, in the preliminary state, the bank may be notified with the masked identification numbers. For example, the bank may be alerted to prevent fraudulent attempts to access the bank account without officially receiving an official death certificate. For example, upon receiving the required confirmation documents 370, the RECS 100 may transmit the document to the bank in the confirmation state to, for example, officially shutting down the bank account and transferring the funds to a beneficiary.

In various implementations, an event-based notification system may include a predetermined asset profile (e.g., the PNP 115) configured to identify relevant entities (e.g., the REM 315, the relevant entities 205) associated with a user. For example, the predetermined asset profile may include a predetermined authorization criterion (e.g., ADP 325) to authenticate a life event notification message. For example, the event-based notification system may include entity notification profiles (e.g., the action models 310). For example, the entry notification profiles may each include notification rules for a corresponding one of the entities identified in the asset profile. For example, upon receiving a life event notification message that meets the predetermined authorization criterion, the event-based notification system may operate in a preliminary stage (e.g., by changing the account state 305) to generate a notification package. For example, the notification package may include customized forms (e.g., the customizable forms 355) and contact instructions (e.g., the contact instructions 360) as a function of the asset profile and the corresponding entity notification profiles.

FIG. 4 is a swim lane diagram showing an exemplary process 400 of the RECS. The process 400 starts when an agent gives a client access (e.g., using the security module 225 to generate an invitation link) to create an account 405. Next, the client, in this example, creates an account and sets up two-step authentication 410. After creating an account, the client enters general information (e.g., address, SSN) 415. Next, the client adds entries to client sections to include information such as banking and loans 420.

In a decision point 425, it is determined whether the client has a will. If the client has a will, the client may upload the will to the system in a step 430. If the client does not have a will, the client may leave it empty 435. After the steps 430 or 435, the client may manage and update the entries over time 440 (e.g., using an online portal).

In this example, the RECS 100 manages client information 445. In a decision point 450, the RECS 100 determines whether the client has passed away. For example, the RECS 100 may check whether a notification from the notification contacts 105 is received. If the client has not passed away, the decision point 450 is repeated. If the client has passed away, it is determined whether client contacts have been notified in a decision point 455. If the client contacts have not all been notified, the RECS 100 notify client contacts 460 and the decision point 455 is repeated. If the client contacts have all been notified, the RECS 100 updates a contact status to "contacted" 465 and the process 400 ends.

Figure 5:
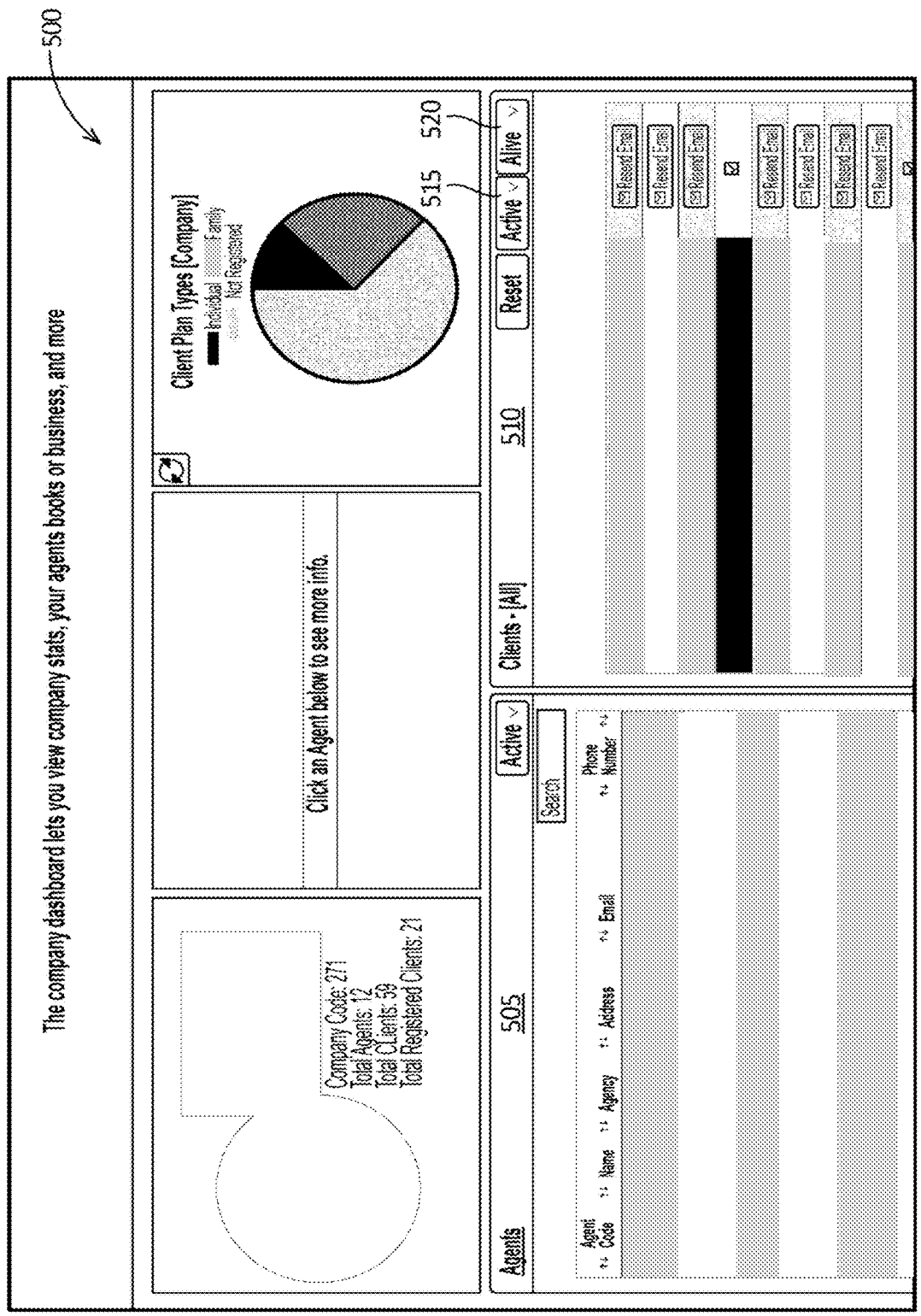
FIG. 5 depicts a schematic diagram showing an exemplary user interface for administrative management in the RECS.

FIG. 5 depicts a schematic diagram showing an exemplary user interface 500 for administrative management in the RECS. For example, an administrator user may use the user interface 500 to manage an entity including agents and clients using the RECS 100. For example, the entity may include an insurance company. For example, the entity may include a senior care service company. In this example, the user interface 500 includes an agent area 505 and a client area.

For example, when the administrator user selects an agent from the agent area 505, clients associated with the selected agent may be displayed in the client area 510. As shown, each client may be filtered by a status 515 and a state 520. As shown, the client area 510 is currently showing clients who have both an active status and an alive state. In some implementations, a client status may include active and inactive. In some examples, the client status may include payment status of the client. For example, the client status may include current process status of the client (e.g., approved, pending, awaiting signatures). In some implementations, the client state may include alive, preliminary deceased, confirmed deceased.

Figure 6A:
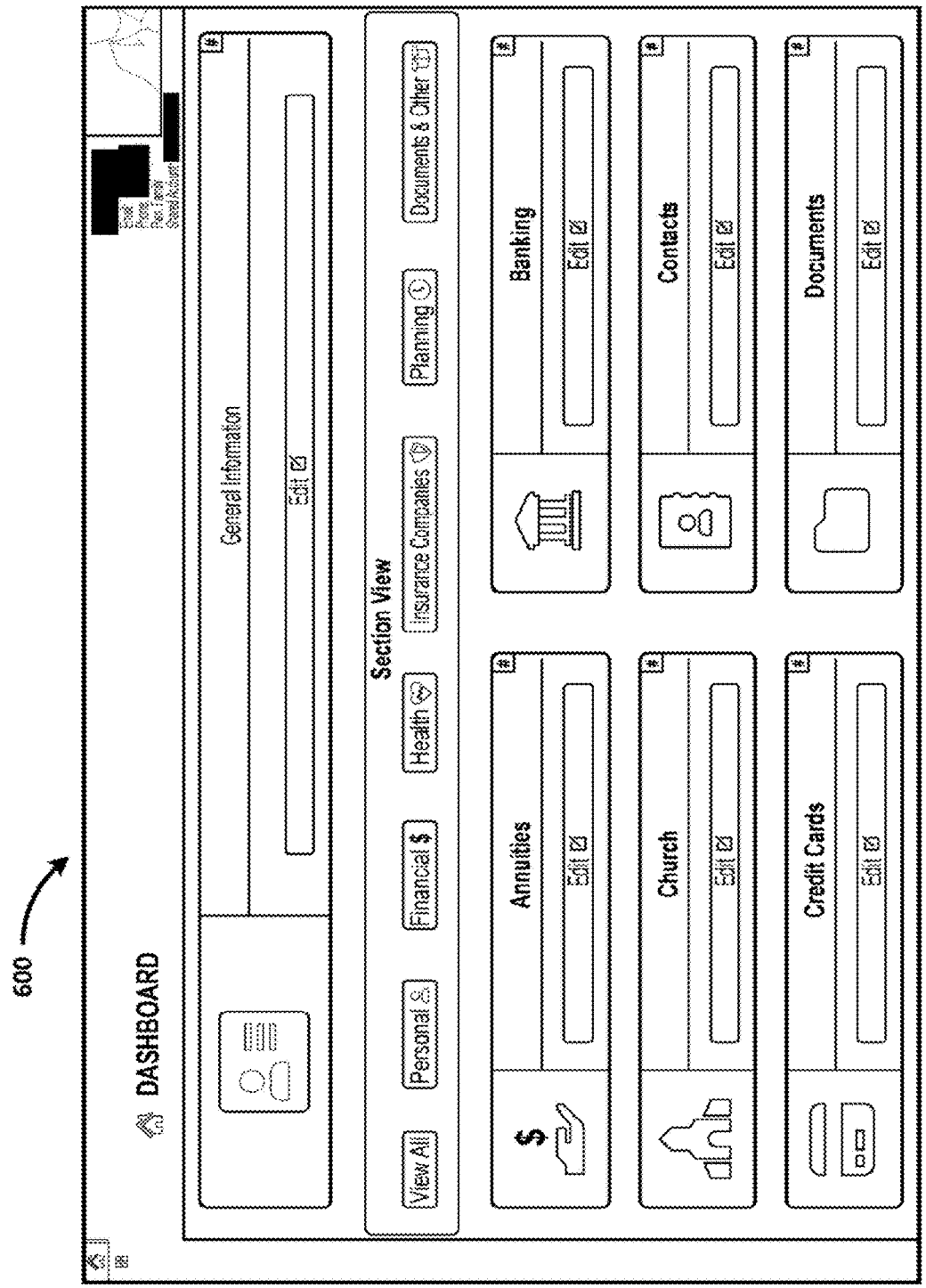

FIG. 6A, FIG. 6B, FIG. 6C, and FIG. 6D depict schematic diagrams showing exemplary user interface for personal notification profile (PNP) management. As shown in FIG. 6A, a user (e.g., the user 210) may logon to be presented with the user interface 600. In some examples, the user 210 may use the user interface 600 to manage and update information of the relevant entities 205. In this example, the user interface 600 includes various categories. The user 210 may select one of the categories to review and/or update the relevant entities in the selected category. In some implementations, the user interface may include a print function. For example, the print function may allow the user 210 to print a list of the relevant entities 205.

As shown, the user interface 600 includes annuities, banking, church, contacts, credit cards, and documents. For example, a user may provide information including death benefit provisions, beneficiary designation, distribution options, and/or contact information (e.g., of beneficiaries, of agents) in the annuities category. For example, a user may provide information including death benefit provisions, beneficiary designation, distribution options, and/or contact information (e.g., of beneficiaries, of agents) in the annuities category. For example, a user may provide information including notification contacts, funeral and memory service instructions, and/or communication details to the congregation in the church category. For example, a user may provide information including account number and/or issuing bank details in the credit card category. For example, a user may provide information including contact details for various contacts in the contact category. For example, a user may provide information including important documents (e.g., Will, birth certificate, lease) in the document category.

Figure 6B:
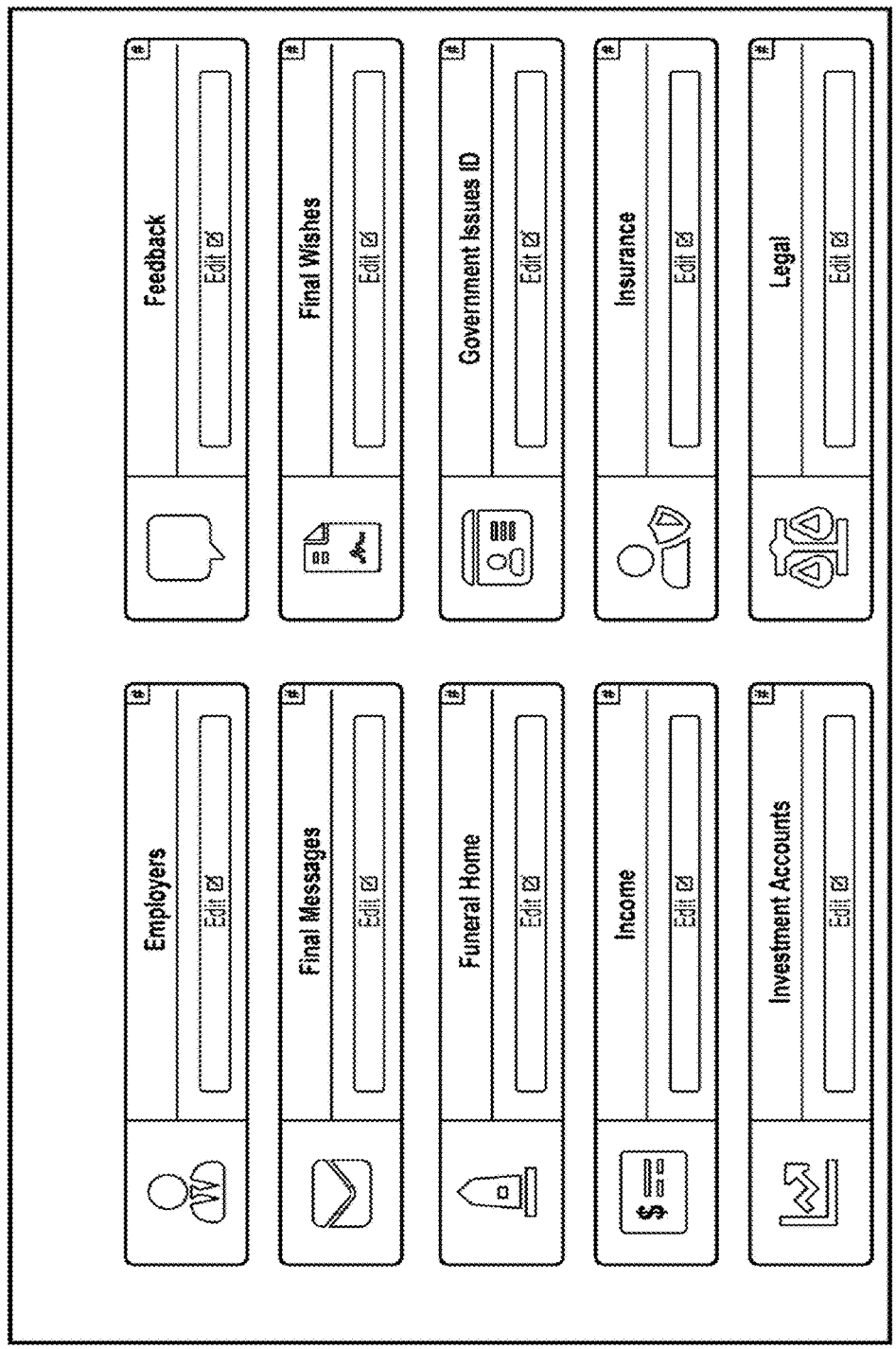

As shown in FIG. 6B, additional categories are shown. For example, an employers category may allow a user to input details of his/her current/past employment. For example, a user may provide information including any final feedback to the system in a feedback category. For example, a user may provide information including final messages to loved ones in a final messages category. For example, a user may provide information including wishes to be fulfilled in a final wishes category. For example, a user may provide information including funeral and memory service instructions and/or payment instructions in the funeral home category. For example, a user may provide information including a list of government issued identification on hand in a government issued ID category.

For example, a user may provide information including various sources of income and dates of the income in an income category. For example, a user may provide information including types of insurance and/or contacts for insurance agents in an insurance category. For example, a user may provide information including types of account and/or company names in an investment accounts category. For example, a user may provide information including one or more lawyers to execute the user's final wishes in a legal category.

As shown in FIG. 6C, additional categories are shown. Various categories may be structured to collect associated contact entity information, location (e.g., branch location), and/or contact information (e.g., phone number, address, information of particular staff to contact, other information). For example, a user may provide information including types of loans and/or company names in a loans category. For example, a user may provide information including doctor names in a medical category. For example, a user may provide information including representative names and/or representation types in a my representative category. For example, a user may provide passport information in a passport category. For example, a user may provide pet information in a pet category 605. For example, a user may provide medication history and/or subscription in a pharmacies category. For example, a user may provide rental information (e.g., house, office, factory, car, equipment) in a rental category. For example, a user may provide residence information (e.g., planned renovation, lease, management fee accounts, utility accounts) in a residences category. For example, a user may provide sharing rules (e.g., access rules) in a sharing category. For example, a user may provide subscription information (e.g., gym, streaming, newspaper) in a subscription category.

Figure 6D:
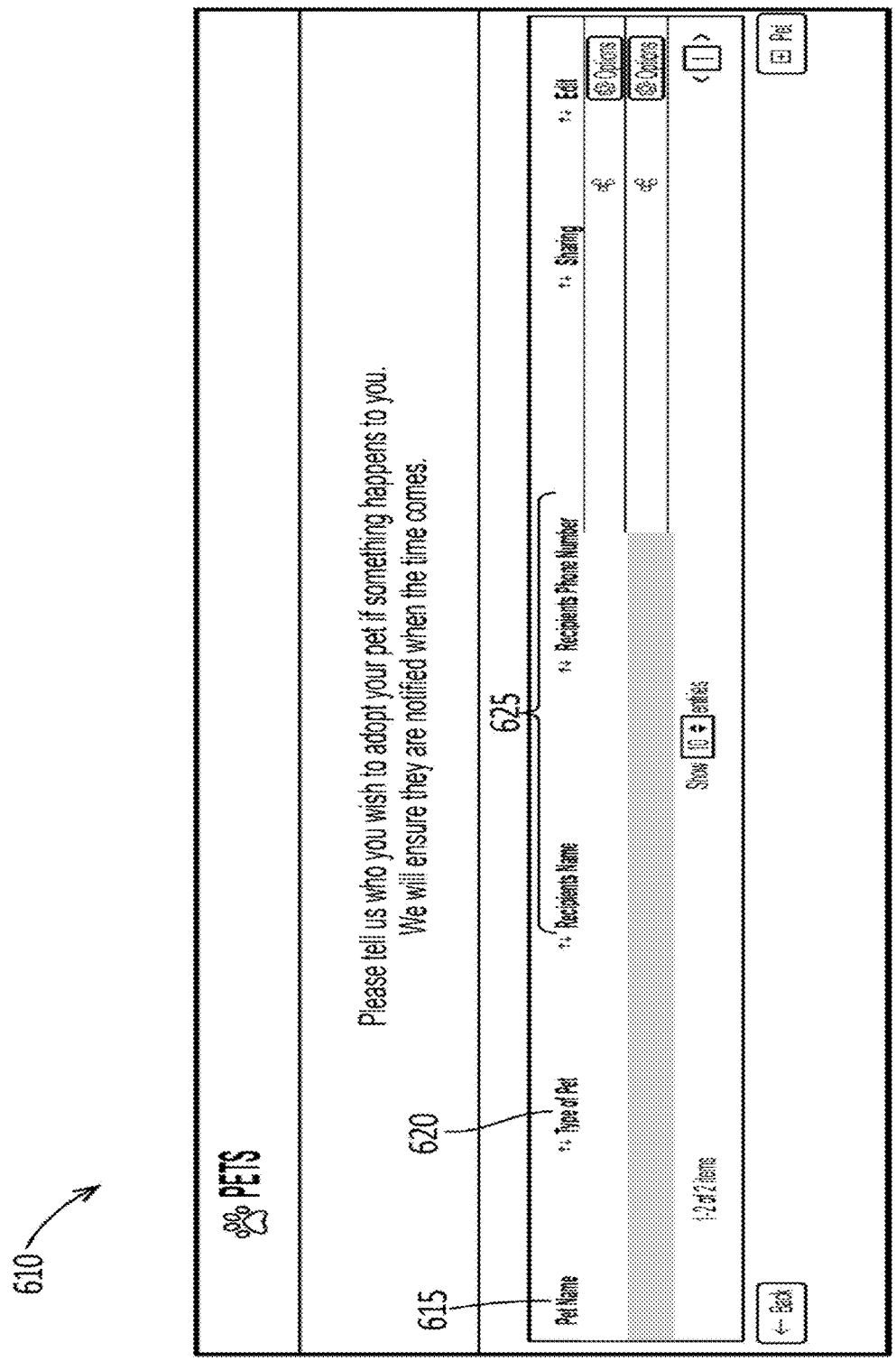

As shown in FIG. 6D, a user interface 610 is shown. For example, the user interface 610 may be generated when the pet category 605 is selected. In this example, a user may input various information in the pet category 605. For example, the user may list, for each pet, a name 615, a type of pet 620, and recipient information 625. In some implementations, different recipients may be listed for different pets. For example, in the preliminary state, the notification engine 240 may generate the event action package to each of the recipients based on the information entered in the user interface 610.

Figure 7:
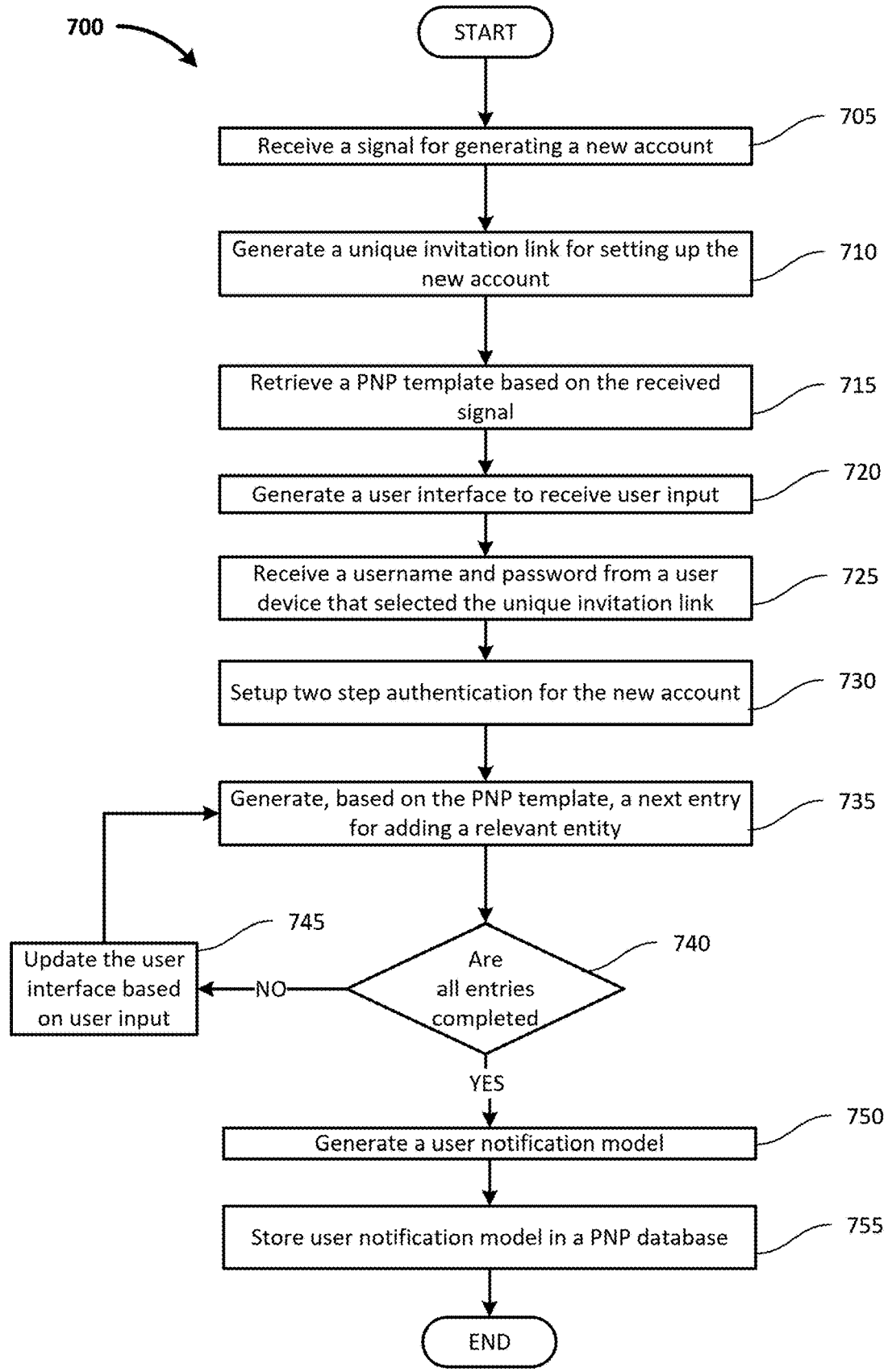
FIG. 7 is a flowchart illustrating an exemplary method for setting up a new user account in an exemplary RECS.

FIG. 7 is a flowchart illustrating an exemplary method 700 for setting up a new user account in an exemplary RECS (e.g., the RECS 100). For example, the RECS 100 may perform the method 700 to create a new user account for the user 210. The method begins when a signal is received for generating a new account in step 705. For example, an agent listed in the agent database 230 may trigger the RECS 100 to send a signal from, for example, a mobile device for generating a new account. For example, the signal may include an email address of a new user.

In step 710, a unique invitation link is generated for setting up the new account. For example, the security module 225 may generate a unique invitation link and send the link to the email address specified by the signal. After the unique invitation link is generated, a PNP template is retrieved based on the received signal in step 715. For example, the user may select the unique invitation link. Based on the received signal, for example, the RECS 100 may retrieve a PNP template as a function of a demographic (e.g., location, device information) of the received signal.

In step 720, a user interface is generated to receive user input. For example, the user interface may be generated to be displayed on a user device of the user 210. Next, a username and password are received from a user device that selected the unique invitation link in step 725. After the username and password are received, in step 730, two step authentication is set up for the new account. Based on a PNP template, in step 735, a next entry for adding a relevant entity is generated. For example, the PNP template 220 may include various categories and known institutions of each category from the ERP 235 and the contact entity profiles 120.

In a decision point 740, it is determined whether all entries are completed. For example, the RECS 100 may check whether all sections in the PNP template 220 are completed. If it is determined that not all entries are completed, in step 745, the user interface is updated based on user input, and the step 735 is repeated. For example, the user interface may be updated to receive additional entries based on previous user input. For example, the user interface may be generated to acquire minimum personal information sufficient personal information to identify an account in a corresponding relevant entity. If it is determined that all entries are completed, in step 750, a user notification model is generated. For example, the user notification model is generated based on the personal identification profile, a predetermined authorization and distribution profile, and at least one relevant entity. Next, the user notification model is stored in a PNP database in step 755, and the method 700 ends.

Figure 8:
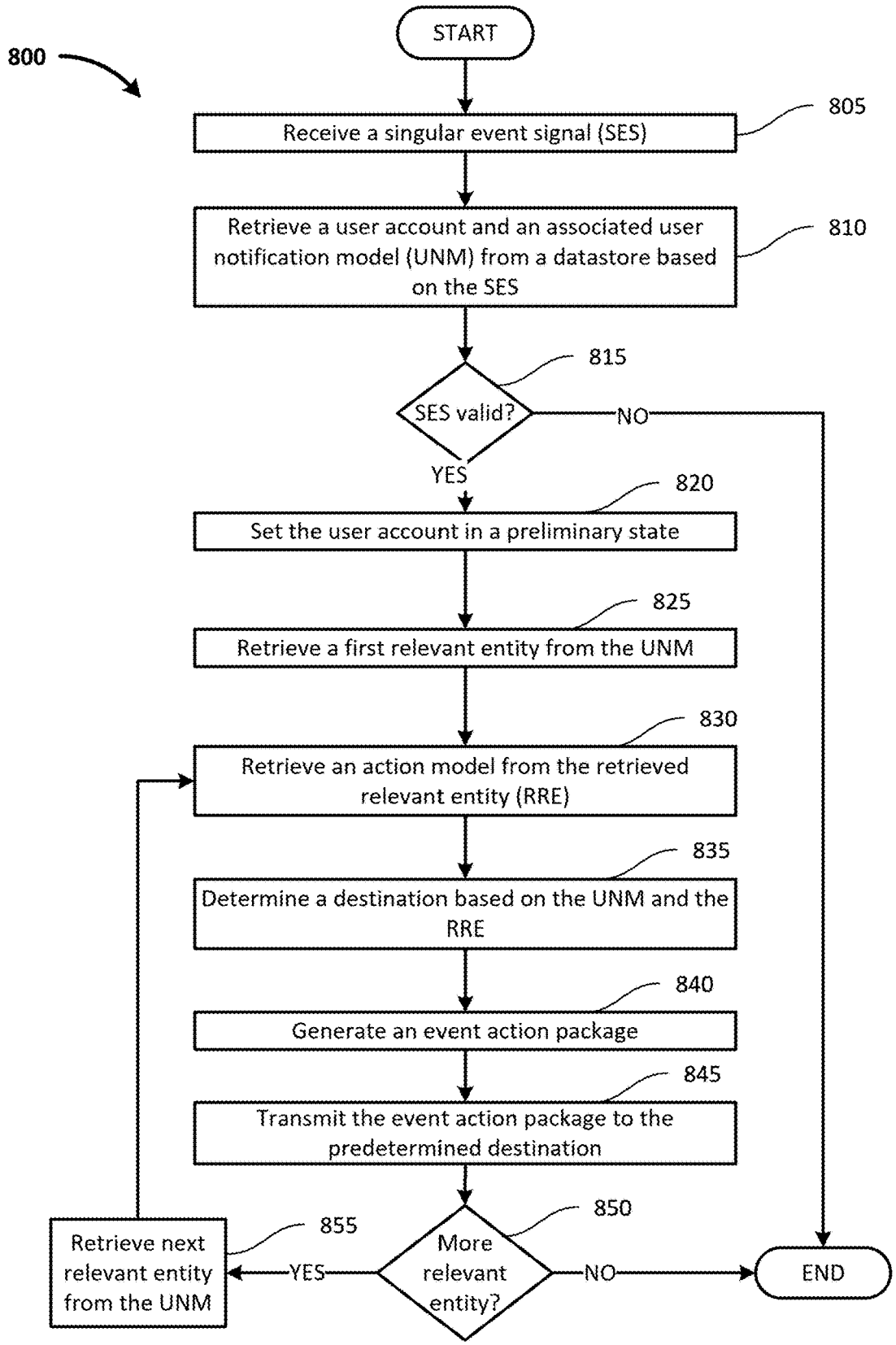
FIG. 8 is a flowchart illustrating an exemplary runtime method of an exemplary RECS.

FIG. 8 is a flowchart illustrating an exemplary runtime method of an exemplary RECS. For example, the method 800 may be performed by the notification resources 215 as described with reference to FIG. 2. In this example, the method 800 begins when a singular event signal (SES) is received in step 805. For example, the RECS 100 may receive a notification of death of a user from the notification contacts 105. In step 810, a user account and an associated user notification model (UNM) is retrieved from a datastore based on the SES. For example, the notification contacts 105 may notify that a specific user has died. For example, then the RECS 100 may retrieve a user account and a PNP based on the specific user.

In a decision point 815, it is determined whether the SES is valid. For example, the notification engine 240 may authenticate the SES based on an authorization profile stored in the UNM. If the SES is not valid, the method 800 ends. If the SES is valid, in step 820, the user account is set in a preliminary state. For example, in the preliminary state, a status of the user may be identified to be possibly deceased but unconfirmed.

In step 825, a first relevant entity is retrieved from the UNM. For example, the notification engine 240 may retrieve the relevant entities 205 based on a predetermined priority. An action model is retrieved from the retrieved relevant entity (RRE) in step 830. For example, the action model 350 including the customizable forms 355, the contact instructions 360, the secure identification rule 365 and the required confirmation documents 370 as described with reference to FIG. 3B may be retrieved. Next, in step 835, a destination is determined based on the UNM and the RRE. For example, the destination may be generated as a function of the received notification signal and a distribution profile specified in the user account. For example, the destination address 250 may be generated as described with reference to FIG. 2.

Next, an event action package is generated in step 840. For example, the event action package may include the customizable forms 355 and the contact instructions 360. In step 845, the event action package is transmitted to the predetermined destination. For example, the notification engine 240 may transmit the event action package to the destination address 250.

In a decision point 850, it is determined whether any additional relevant entity is in the UNM. If there is at least one more relevant entity to be processed, in step 855, a next relevant entity from the UNM is retrieved, and the step 830 is repeated. If there is no more relevant entity to be processed, the method 800 ends.

Figure 9:
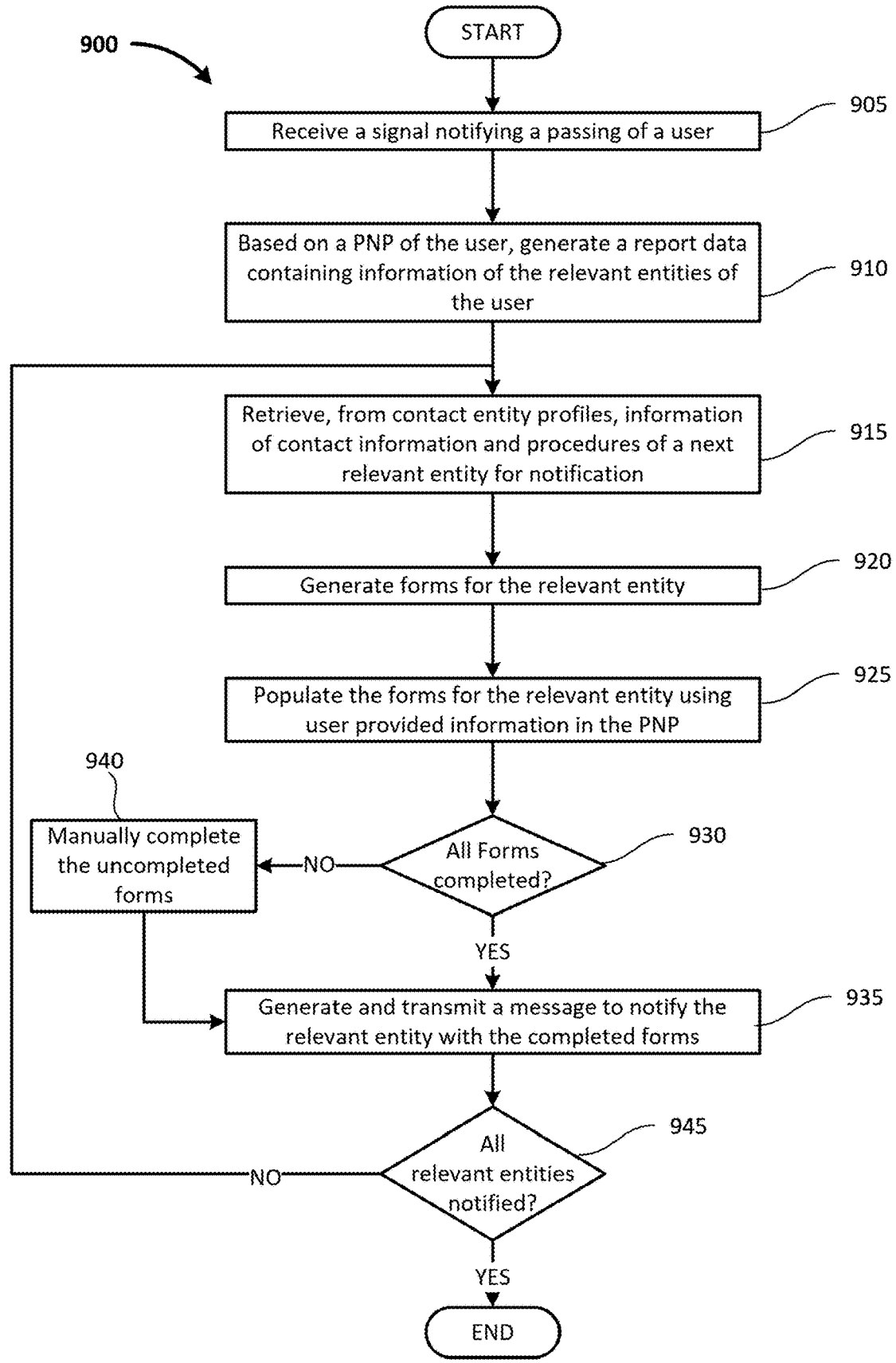
FIG. 9 is a flowchart illustrating an exemplary embodiment of the runtime method described with reference to FIG. 8.

FIG. 9 is a flowchart illustrating an exemplary embodiment of the runtime method described with reference to FIG. 8. For example, the notification resources 215 as described in FIG. 2 may perform the runtime method 900. The runtime method 900 begins in step 905 when a signal is received notifying a passing of a user. For example, the notification contacts 105 may inform the notification resources 215 of a user's passing by calling the RECS 100 and provide the unique identification of the user.

In step 910, a report data containing information of the relevant entities of the user is generated based on a PNP of the user. In this example, after the report data is generated, information of contact information and procedures of a next relevant entity for notification is retrieved from contact entity profiles in step 915. In step 920, forms for the relevant entity are generated. For example, the computer server 245 may generate claim forms corresponding to an insurance company. Next, in step 925, the forms are populated for the relevant entity using user provided information in the PNP.

In a decision point 930, it is determined whether all forms are completed. For example, the computer server 245 may check whether required fields are successfully filled in. If it is determined that all forms are completed, a message is generated and transmitted to notify the relevant entity with the completed forms in step 935. If it is determined that not all forms are completed, then the uncompleted forms are manually completed (e.g., by the notification engine 240) in step 940 and the step 935 is performed.

In a decision point 945, it is determined whether all relevant entities are notified. For example, the computer server 245 may check whether all of the relevant entities listed in the report data are marked with a "contacted" status. If it is determined that all relevant entities are notified, the method 900 ends. If it is determined that not all relevant entities are notified, the step 915 is repeated.

Although various embodiments have been described with reference to the figures, other embodiments are possible. In some implementations, the RECS 100 may generate (e.g., periodically in 2, 4, 6, 12, or 24 months) a query message (e.g., an email) to the user 210 to remind the user 210 to update the PNP 115 if anything is changed. For example, the query message may include a link directing the user to a PNP update template. For example, the PNP update template may advantageously guide the user 210 to update the PNP 115.

In some implementations, other types of trigger events may be included in the RECS 100. For example, the RECS 100 may include process(es) to notify at least a subset of the relevant entities 205 when the user is incapacitated (e.g., a stroke). In some implementations, for example, the RECS 100 may include a process(es) to notify at least a subset of the relevant entities 205 having a long-term relocation (e.g., join a tour with the military). For example, the relevant entities 205 and/or a subset of relevant entities 205 may be dynamically determined based on a predetermined entity type stored in a datastore (e.g., the contact entity profiles 120 and/or the ERP 235) and a predetermined association of the predetermined entity type with the selected process stored in a datastore (e.g., in a PNP template 220, in a process template (not shown)). In some implementations, a PNP template 220 may define one or more predetermined notification processes. In some implementations, by way of example and not limitation, predetermined notification process templates may be stored in a predetermined datastore(s). An association (e.g., in a metadata structure, in a database structure) of the process template may be stored with particular contact entity profiles, PNP templates, entity relationship profiles, personal notification profiles, attributes thereof, or some combination thereof.

In some implementations, the RECS 100 may include commercial specific notifications. For example, the user 210 may provide business or sales information to the RECS 100 in the PNP 115. In some examples, the RECS 100 may notify some relevant entities 205 (e.g., the local police, building manager of the business, bank of the business, existing clients) to advantageously prevent, for example, employees and/or other business partners from fraudulent actions (e.g., taking advantage of vendor accounts).

Although an exemplary system has been described with reference to FIGS. 1-2, other implementations may be deployed in other industrial, scientific, medical, commercial, and/or residential applications.

In some implementations, the PNP template 220 may include a national will template. For example, if the user 210 wishes to create a will during account setup or after login into the RECS 100, the user 210 may use the national will template to create a will. For example, the RECS 100 may send the will to a user selected execution contact upon receiving a notification of passing away of the user 210.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as a 9V (nominal) batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device. The display device may, for example, include an LED (light-emitting diode) display. In some implementations, a display device may, for example, include a CRT (cathode ray tube). In some implementations, a display device may include, for example, an LCD (liquid crystal display). A display device (e.g., monitor) may, for example, be used for displaying information to the user. Some implementations may, for example, include a keyboard and/or pointing device (e.g., mouse, trackpad, trackball, joystick), such as by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a system may include a data store comprising a program of instructions. For example, the system may include a processor operably coupled to the data store. For example, when the processor executes the program of instructions, the processor may cause operations to be performed to automatically authenticate a singular event signal and dynamically generate an event action package as a function of the singular event signal and predetermined attributes. For example, the operations may include receive a signal from a user device. For example, the operations may include retrieve, from a first data store, a personal notification template based on the received signal. For example, the personal notification template may be configured to generate a user account. For example, the personal notification template may include personal identification entries and at least one asset entry. For example, each of the at least one asset entry may identify a relevant entity associated with the user account.

For example, the operations may include generate a user interface to receive user inputs dynamically based on the personal notification template and the at least one asset entry. For example, the user interface dynamically acquires sufficient personal information to identify an account in a corresponding relevant entity. For example, the operations may include generate a user notification model. For example, the user notification model may include a cryptic personal identification generated based on the personal identification entries, a predetermined authorization and distribution profile, and at least one relevant entity. For example, the operations may include store the user notification model to a second data store.

Upon receiving a singular event signal, for example, the singular event signal may identify a singular event of a user account, retrieve the user notification model from the second data store. For example, the operations may include authorize the singular event signal using the predetermined authorization and distribution profile. For example, if the singular event signal may be authorized, the operation may include set the user account into a preliminary state. For example, the operations may include retrieve, from the user notification model the at least one relevant entity. For example, the operations may include, for each of the at least one relevant entity, retrieve, from a third data store, an action model specific to the corresponding relevant entity. For example, the operations may include apply the action model to the predetermined authorization and distribution profile to generate an event action package to be transmitted to a predetermined destination. For example, the event action package may include customized forms and contact instructions, and the predetermined destination may be generated as a function of the singular event signal and the predetermined authorization and distribution profile, such that a timely and secure response to the singular event signal may be generated at the predetermined destination associated to the relevant entity. Upon receiving a digital event confirmation certificate, for example, the operations may include authorize the digital event confirmation certificate based on a predetermined certificate authentication rule. If the digital event confirmation certificate may be authorized, for example, the operations may include set the user account to a confirmation state, and, generate a confirmation signal to at least some of the at least one relevant entity.

For example, the predetermined destination may include a plurality of notification entities, such that a unique event action package may be generated for each of the plurality of notification entities based on the predetermined authorization and distribution profile.

For example, the operations may include transmit a unique invitation link to the user device. For example, the operations may include generate the personal notification template based on a geographical location of the user device.

For example, the cryptic personal identification may include a partial personal identification of the user, such that compromise of the cryptic personal identification does not reveal a complete personal identity associated with the user account. For example, the contact instructions comprise guidance messages interactively generated as a function of user response received from the user device.

In an illustrative aspect, a computer-implemented method performed by at least one processor to automatically authenticate a singular event signal and dynamically generate an event action package as a function of the singular event signal and predetermined attributes may include, upon receiving a singular event signal. For example, the singular event signal may identify a singular event of a user account, retrieve a user notification model from a first data store. For example, the user notification model may include a cryptic personal identification, a predetermined authorization and distribution profile, and at least one relevant entity. For example, the method may include authorize the singular event signal using the predetermined authorization and distribution profile.

If the singular event signal may be authorized, for example, the method may include set the user account into a preliminary state. For example, the method may include retrieve, from the user notification model, the at least one relevant entity. For example, the method may include, for each of the at least one relevant entity, retrieve, from a third data store, an action model specific to the relevant entity. For example, the method may include apply the action model to the predetermined authorization and distribution profile to generate an event action package to be transmitted to a predetermined destination. For example, the event action package may include customized forms and contact instructions. For example, the predetermined destination may be generated as a function of the singular event signal and the predetermined authorization and distribution profile, such that a timely and secure response to the singular event signal may be generated at the predetermined destination associated to the relevant entity. For example, the method may include, upon receiving a digital event confirmation certificate, authorize the digital event confirmation certificate based on a predetermined certificate authentication rule. For example, the method may include, if the digital event confirmation certificate may be authorized, set the user account to a confirmation state, and, generate a confirmation signal to at least some of the at least one relevant entity.

The computer-implemented method, for example, may include receive a signal from a user device. For example, the method may include retrieve, from a second data store, a personal notification template based on the received signal. For example, the personal notification template may be configured to generate a user account. The personal notification template, for example, may include personal identification entries and at least one asset entry. For example, each of the at least one asset entry may identify a relevant entity associated with the user account. For example, the method may include generate a user interface to receive user inputs. For example, the method may include generate the user notification model. For example, the user notification model may include a cryptic personal identification generated based on the personal identification profile, a predetermined authorization and distribution profile, and at least one relevant entity. For example, the method may include store the user notification model to a second data store.

For example, the user interface may be generated based on the personal notification template and the at least one asset entry. For example, the user interface dynamically acquires sufficient personal information to identify an account in a corresponding relevant entity.

For example, the predetermined destination may include a plurality of notification entities, such that a unique event action package may be generated for each of the plurality of notification entities based on the predetermined authorization and distribution profile.

The computer-implemented method, for example, may include transmit a unique invitation link to the user device. For example, the method may include generate the personal notification template based on a geographical location of the user device.

For example, the cryptic personal identification may include a partial personal identification of the user, such that compromise of the cryptic personal identification does not reveal a complete personal identity associated with the user account.

For example, the contact instructions comprise guidance messages interactively generated as a function of user response received from the user device.

In an illustrative aspect, a computer program product may include a program of instructions tangibly embodied on a computer readable medium wherein when the instructions are executed on a processor. For example, the processor may cause operations to be performed to automatically authenticate a singular event signal and dynamically generate an event action package as a function of the singular event signal and predetermined attributes. For example, the operations may include, upon receiving a singular event signal, the singular event signal may identify a singular event of a user account, retrieve a user notification model from a first data store. For example, the user notification model may include a cryptic personal identification, a predetermined authorization and distribution profile, and at least one relevant entity. For example, the operations may include authorize the singular event signal using the predetermined authorization and distribution profile.

For example, the operations may include, if the singular event signal may be authorized, set the user account into a preliminary state. For example, the operations may include retrieve, from the user notification model, the at least one relevant entity. For example, the operations may include for each of the at least one relevant entity, retrieve, from a third data store, an action model specific to the relevant entity. For example, the operations may include apply the action model to the predetermined authorization and distribution profile to generate an event action package to be transmitted to a predetermined destination. For example, the event action package may include customized forms and contact instructions, and the predetermined destination may be generated as a function of the singular event signal and the predetermined authorization and distribution profile, such that a timely and secure response to the singular event signal may be generated at the predetermined destination associated to the relevant entity.

The operations, for example, may include, upon receiving a digital event confirmation certificate, authorize the digital event confirmation certificate based on a predetermined certificate authentication rule. For example, the operations may include, if the digital event confirmation certificate may be authorized, set the user account to a confirmation state, and, generate a confirmation signal to at least some of the at least one relevant entity.

The operations, for example, may include receive a signal from a user device. For example, the operations may include retrieve, from a second data store, a personal notification template based on the received signal. For example, the personal notification template may be configured to generate a user account. For example, the personal notification template may include personal identification entries and at least one asset entry. For example, each of the at least one asset entry may identify a relevant entity associated with the user account.

For example, the operations may include generate a user interface to receive user inputs. For example, the operations may include generate the user notification model. For example, the user notification model may include a cryptic personal identification generated based on the personal identification profile, a predetermined authorization and distribution profile, and at least one relevant entity. For example, the operations may include store the user notification model to a second data store.

For example, the user interface may be generated based on the personal notification template and the at least one asset entry. For example, the user interface dynamically acquires sufficient personal information to identify an account in a corresponding relevant entity.

For example, the predetermined destination may include a plurality of notification entities, such that a unique event action package may be generated for each of the plurality of notification entities based on the predetermined authorization and distribution profile.

For example, the cryptic personal identification may include a partial personal identification of the user, such that compromise of the cryptic personal identification does not reveal a complete personal identity associated with the user account.

For example, the contact instructions comprise guidance messages interactively generated as a function of user response received from the user device.

The operations, for example, may include transmit a unique invitation link to the user device. For example, the operations may include generate the personal notification template based on a geographical location of the user device.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A system comprising:
a data store comprising a program of instructions; and,
a processor operably coupled to the data store such that, when the processor executes the program of instructions, the processor causes operations to be performed to automatically authenticate a singular event signal and dynamically generate an event action package as a function of the singular event signal and predetermined attributes, the operations comprising:
upon receiving a singular event signal, wherein the singular event signal identifies a singular event of a user account, authorize the singular event signal using a predetermined authorization and distribution profile of a user notification model, wherein the user notification model further comprises a cryptic personal identification and at least one relevant entity; and,
when the singular event signal is authorized,
(a) set the user account into a preliminary state, and
(b) for each of the at least one relevant entity of the user notification model,
apply an action model specific to the corresponding relevant entity to the predetermined authorization and distribution profile to generate an event action package to be transmitted to a predetermined destination, wherein the event action package comprises customized forms and contact instructions, and the predetermined destination is generated as a function of the singular event signal and the predetermined authorization and distribution profile, such that a timely and secure response to the singular event signal is generated at the predetermined destination associated to the relevant entity.

2. The system of claim 1, wherein the predetermined destination comprises a plurality of notification entities, such that a unique event action package is generated for each of the plurality of notification entities based on the predetermined authorization and distribution profile.

3. The system of claim 1, wherein the contact instructions comprise guidance messages interactively generated as a function of user response received from the user device.

4. The system of claim 1, wherein the operations further comprise:
- upon receiving a digital event confirmation certificate, authorize the digital event confirmation certificate based on a predetermined certificate authentication rule; and,
- when the digital event confirmation certificate is authorized, set the user account to a confirmation state, and, generate a confirmation signal to at least some of the at least one relevant entity.

5. A computer-implemented method performed by at least one processor to automatically authenticate a singular event signal and dynamically generate an event action package as a function of the singular event signal and predetermined attributes, the method comprising:
- upon receiving a singular event signal, wherein the singular event signal identifies a singular event of a user account,
- authorize the singular event signal using a predetermined authorization and distribution profile of a user notification model, wherein the user notification model further comprises a cryptic personal identification and at least one relevant entity; and,
- when the singular event signal is authorized,
  - (a) set the user account into a preliminary state, and
  - (b) for each of the at least one relevant entity of the user notification model,
    - apply an action model specific to the corresponding relevant entity to the predetermined authorization and distribution profile to generate an event action package to be transmitted to a predetermined destination, wherein the event action package comprises customized forms and contact instructions, and the predetermined destination is generated as a function of the singular event signal and the predetermined authorization and distribution profile.

6. The computer-implemented method of claim 5, further comprises:
- receive a signal from a user device;
- retrieve, from a second data store, a personal notification template based on the received signal, wherein the personal notification template is configured to generate a user account, and comprises personal identification entries and at least one asset entry, wherein each of the at least one asset entry identifies a relevant entity associated with the user account;
- generate a user interface to receive user inputs;
- generate the user notification model, wherein the user notification model comprises a cryptic personal identification generated based on the personal identification profile, a predetermined authorization and distribution profile, and at least one relevant entity; and,
- store the user notification model to a second data store.

7. The computer-implemented method of claim 6, wherein the user interface is generated based on the personal notification template and the at least one asset entry, such that the user interface dynamically acquires sufficient personal information to identify an account in a corresponding relevant entity.

8. The computer-implemented method of claim 5, wherein the predetermined destination comprises a plurality of notification entities, such that a unique event action package is generated for each of the plurality of notification entities based on the predetermined authorization and distribution profile.

9. The computer-implemented method of claim 6, further comprises:
- transmit a unique invitation link to the user device; and,
- generate the personal notification template based on a geographical location of the user device.

10. The computer-implemented method of claim 5, wherein the cryptic personal identification comprises a partial personal identification of the user, such that compromise of the cryptic personal identification does not reveal a complete personal identity associated with the user account.

11. The computer-implemented method of claim 6, wherein the contact instructions comprise guidance messages interactively generated as a function of user response received from the user device.

12. The computer-implemented method of claim 5, further comprises:
- upon receiving a digital event confirmation certificate, authorize the digital event confirmation certificate based on a predetermined certificate authentication rule; and,
- when the digital event confirmation certificate is authorized, set the user account to a confirmation state, and, generate a confirmation signal to at least some of the at least one relevant entity.

13. A computer program product comprising:
- a program of instructions tangibly embodied on a non-transitory computer readable medium wherein when the instructions are executed on a processor, the processor causes operations to be performed to automatically authenticate a singular event signal and dynamically generate an event action package as a function of the singular event signal and predetermined attributes, the operations comprising:
- upon receiving a singular event signal, wherein the singular event signal identifies a singular event of a user account,
- authorize the singular event signal using a predetermined authorization and distribution profile of a user notification model, wherein the user notification model further comprises a cryptic personal identification and at least one relevant entity; and,
- when the singular event signal is authorized,
  - (a) set the user account into a preliminary state, and
  - (b) for each of the at least one relevant entity of the user notification model,
    - apply an action model specific to the corresponding relevant entity to the predetermined authorization and distribution profile to generate an event action package to be transmitted to a predetermined destination, wherein the event action package comprises customized forms and contact instructions, and the predetermined destination is generated as a function of the singular event signal and the predetermined authorization and distribution profile.

14. The computer program product of claim 13, further comprises:
- upon receiving a digital event confirmation certificate, authorize the digital event confirmation certificate based on a predetermined certificate authentication rule; and,
- if the digital event confirmation certificate is authorized, set the user account to a confirmation state, and, generate a confirmation signal to at least some of the at least one relevant entity.

15. The computer program product of claim 13, further comprises:
  receive a signal from a user device;
  retrieve, from a second data store, a personal notification template based on the received signal, wherein the personal notification template is configured to generate a user account, and comprises personal identification entries and at least one asset entry, wherein each of the at least one asset entry identifies a relevant entity associated with the user account;
  generate a user interface to receive user inputs;
  generate the user notification model, wherein the user notification model comprises a cryptic personal identification generated based on the personal identification profile, a predetermined authorization and distribution profile, and at least one relevant entity; and,
  store the user notification model to a second data store.

16. The computer program product of claim 15, wherein the user interface is generated based on the personal notification template and the at least one asset entry, such that the user interface dynamically acquires sufficient personal information to identify an account in a corresponding relevant entity.

17. The computer program product of claim 13, wherein the predetermined destination comprises a plurality of notification entities, such that a unique event action package is generated for each of the plurality of notification entities based on the predetermined authorization and distribution profile.

18. The computer program product of claim 13, wherein the cryptic personal identification comprises a partial personal identification of the user, such that compromise of the cryptic personal identification does not reveal a complete personal identity associated with the user account.

19. The computer program product of claim 15, wherein the contact instructions comprise guidance messages interactively generated as a function of user response received from the user device.

20. The computer program product of claim 15, further comprises:
  transmit a unique invitation link to the user device; and,
  generate the personal notification template based on a geographical location of the user device.

* * * * *